US008815983B2

(12) United States Patent
Gerk et al.

(10) Patent No.: US 8,815,983 B2
(45) Date of Patent: Aug. 26, 2014

(54) DISPERSION, METHOD FOR PRODUCING SAME, AND USE THEREOF

(75) Inventors: Christian Gerk, Ostlutter (DE); Ulf Waag, Bad Saeckingen (DE)

(73) Assignee: H. C. Starck GmbH, Goslar (DE)

( * ) Notice: Subject to any disclaimer, the term of this patent is extended or adjusted under 35 U.S.C. 154(b) by 0 days.

(21) Appl. No.: 13/639,865

(22) PCT Filed: Apr. 4, 2011

(86) PCT No.: PCT/EP2011/055170
§ 371 (c)(1),
(2), (4) Date: Dec. 7, 2012

(87) PCT Pub. No.: WO2011/124542

PCT Pub. Date: Oct. 13, 2011

(65) Prior Publication Data

US 2013/0068365 A1 Mar. 21, 2013

(30) Foreign Application Priority Data

Apr. 8, 2010 (DE) .......................... 10 2010 014 267

(51) Int. Cl.
| | |
|---|---|
| *C08K 9/10* | (2006.01) |
| *B29C 65/00* | (2006.01) |
| *B28B 1/14* | (2006.01) |
| *B05D 3/02* | (2006.01) |
| *A47J 36/02* | (2006.01) |
| *C04B 35/628* | (2006.01) |
| *B23K 35/30* | (2006.01) |
| *C22C 29/08* | (2006.01) |
| *B22F 3/22* | (2006.01) |
| *C22C 9/00* | (2006.01) |
| *B23K 35/02* | (2006.01) |
| *C23C 24/00* | (2006.01) |
| *B32B 37/14* | (2006.01) |
| *C09D 7/12* | (2006.01) |
| *C22C 19/05* | (2006.01) |
| *B05D 5/00* | (2006.01) |
| *B23K 35/32* | (2006.01) |
| *B23K 35/36* | (2006.01) |
| *B22F 5/00* | (2006.01) |
| *B23K 35/26* | (2006.01) |
| *B22F 1/02* | (2006.01) |
| *C01B 31/34* | (2006.01) |
| *C04B 35/56* | (2006.01) |
| *C04B 35/634* | (2006.01) |
| *B22F 1/00* | (2006.01) |
| *C04B 35/626* | (2006.01) |
| *B22F 9/08* | (2006.01) |
| *C08K 3/00* | (2006.01) |
| *C08K 3/14* | (2006.01) |

(52) U.S. Cl.
CPC ... *C08K 9/10* (2013.01); *B22F 9/08* (2013.01); *C04B 35/62897* (2013.01); *B23K 35/304* (2013.01); *C04B 2235/5427* (2013.01); *C22C 29/08* (2013.01); *B22F 3/22* (2013.01); *C22C 9/00* (2013.01); *B22F 2999/00* (2013.01); *B23K 35/025* (2013.01); *C23C 24/00* (2013.01); *B23K 35/3033* (2013.01); *C08K 3/0091* (2013.01); *C04B 2235/422* (2013.01); *B32B 37/14* (2013.01); *C08K 3/0008* (2013.01); *C09D 7/1216* (2013.01); *C22C 19/058* (2013.01); *C04B 2235/427* (2013.01); *C04B 2235/528* (2013.01); *B05D 5/00* (2013.01); *B23K 35/327* (2013.01); *C04B 2235/5436* (2013.01); *C08K 3/14* (2013.01); *B23K 35/3612* (2013.01); *C09D 7/1225* (2013.01); *B22F 5/006* (2013.01); *C04B 2235/3847* (2013.01); *B23K 35/3046* (2013.01); *B23K 35/262* (2013.01); *B22F 1/02* (2013.01); *C22C 19/057* (2013.01); *C01B 31/34* (2013.01); *C04B 35/5626* (2013.01); *C04B 35/63464* (2013.01); *B23K 35/302* (2013.01); *B22F 1/0059* (2013.01); *B22F 1/0048* (2013.01); *C04B 35/6261* (2013.01); *C04B 35/62831* (2013.01)
USPC ........................................................ 523/210

(58) Field of Classification Search
USPC .......... 523/210; 156/60; 264/299; 427/372.2; 228/101
See application file for complete search history.

(56) References Cited

U.S. PATENT DOCUMENTS

| 3,743,556 A | 7/1973 | Breton et al. |
|---|---|---|
| 5,164,247 A | 11/1992 | Solanki et al. |

(Continued)

FOREIGN PATENT DOCUMENTS

| CN | 100 400 218 C | 7/2008 |
|---|---|---|
| DE | 2115 358 | 10/1971 |

(Continued)

OTHER PUBLICATIONS

ASTM B 214: "Standard Test Method for Sieve Analysis of Metal Powders", ASTM Int'l, pp. 1-4 (Mar. 14, 2007).
DIN ISO 4505: "Hardmetals; Metallographic determination of porosity and uncombined carbon", pp. 1-7 (Aug. 1, 1978).

*Primary Examiner* — William Cheung
(74) *Attorney, Agent, or Firm* — Norman B. Thot

(57) ABSTRACT

A dispersion comprising hard material particles and at least one organic binder and/or at least one plasticizer. The hard material particles comprise an inner core comprising a fused tungsten carbide and an outer shell comprising tungsten carbide.

25 Claims, No Drawings

(56) References Cited

U.S. PATENT DOCUMENTS

| | | |
|---|---|---|
| 6,248,149 B1 | 6/2001 | Massey et al. |
| 6,309,761 B1 | 10/2001 | Guesdon et al. |
| 6,649,682 B1 | 11/2003 | Breton et al. |
| 2007/0079905 A1 | 4/2007 | Gerk |
| 2009/0263646 A1 | 10/2009 | Gerk et al. |
| 2010/0196734 A1* | 8/2010 | Svec et al. .................... 428/548 |
| 2011/0056142 A1 | 3/2011 | Sheridan |

FOREIGN PATENT DOCUMENTS

| | | |
|---|---|---|
| DE | 103 54 543 B3 | 8/2005 |
| EP | 2 105 256 A1 | 9/2009 |
| GB | 2 352 727 A | 2/2001 |
| WO | WO 2004/085690 A1 | 10/2004 |
| WO | WO 2008/031121 A1 | 3/2008 |
| WO | WO 2010/040498 A1 | 4/2010 |

* cited by examiner

US 8,815,983 B2

DISPERSION, METHOD FOR PRODUCING SAME, AND USE THEREOF

CROSS REFERENCE TO PRIOR APPLICATIONS

This application is a U.S. National Phase application under 35 U.S.C. §371 of International Application No. PCT/EP2011/055170, filed on Apr. 4, 2011 and which claims benefit to German Patent Application No. 10 2010 014 267.0, filed on Apr. 8, 2010. The International Application was published in German on Oct. 13, 2011 as WO 2011/124542 A2 under PCT Article 21(2).

FIELD

The present invention relates to dispersions, wherein the dispersions contain hard material particles and at least one organic binder and/or at least one plasticizer and the hard material particles have an inner core composed of fused tungsten carbide and an outer shell composed of tungsten carbide.

BACKGROUND

Fused tungsten carbide (FTC) is a particularly advantageous compound for wearing protection because of its high hardness and toughness. However, the use of FTC in dispersions for coating purposes and for producing drill bits is limited by the heat treatment required. In the heat treatment, the FTC is exposed to a liquid metal bath and parts of the FTC dissolve in the metal bath, which later has an adverse effect on the properties of the treated component. The temperature employed in the production process is a function of the binder metal used. The dissolution rate of the FTC in turn depends on the chemical nature of the binder metal used itself and on the temperatures employed. The degree to which customary binder metals attack FTC decreases in the order Fe>Ni>Cu. A hard material having a shell composed of tungsten carbide and a core composed of fused tungsten carbide combines the high hardness and toughness of the fused carbide in the interior of the particle with the chemical resistance of the WC shell in a metallic matrix at high temperature. This particular hard material will hereinafter be referred to as macroline FTC.

A particularly advantageous use form of hard materials is a dispersion in an organic binder. A dispersion can be produced and, for example, applied to a surface simply and inexpensively. Targeted setting of the viscosity, the addition of further hard materials or metal powders or further mechanical upgrading steps such as kneading or calendering enable dispersions to be produced for particular applications. However, the setting of the viscosity influences the processing properties of the dispersions. A particularly advantageous range for the processing of hard material dispersions is in the viscosity range from paints and pastes through to self-supporting but flexible components such as foils (sheets).

Fields of use of the dispersions are, in particular, in the field of surface coating but also in the production of drill bits. A dispersion is here advantageously joined by soldering processes or infiltration to the component subject to stress. The solder material necessary for metallurgical bonding is frequently likewise made available as a dispersion, e.g., as a tape. The hard material dispersion and the solder dispersion can also be present as multilayers. As an alternative, the solder material can also be supplied independently of the hard material, as in, for example, the infiltration of a drill bit.

DE 10 354 543 B3 describes the production of a tungsten carbide powder (cFTC), with the powder particles having a core composed of fused tungsten carbide (FTC) and a shell composed of tungsten monocarbide. The production of cFTC is carried out by heating a fused tungsten carbide powder in the presence of a carbon source to a temperature of 1300-2000° C. The cFTC powder can have a broken, sharp-edged or spherical morphology. The great advantage of cFTC is the chemical resistance to liquid metals, which is of great importance in, for example, the soldering-in and welding-on of coatings or in the infiltration of drill bits. The stabilization of the FTC by the WC shell against the binder metals, usually nickel, copper, cobalt or iron alloys with various alloying elements such as Mn, P, B or Si, leads to substantial retention of the hard material content used and thus to avoidance of the precipitation of brittle carbides during the solidification operation and to stabilization of the viscosity of the metal bath. DE 10354543 B3 claims, inter alia, the use of FTC for surface coating by means of conventional methods proceeding from powders or powder mixtures, e.g., welding or spraying.

DE 2 115 358 and U.S. Pat. No. 3,743,556 describe a process for producing layers composed of a fine filler dispersed in a metal. The production of tapes containing organic materials, metal powder and tungsten carbide has, according to U.S. Pat. No. 3,743,556, been prior art since the 1970s. The use of diamonds as a filler is also mentioned therein. However, the abovementioned documents do not indicate how the diamonds can be placed at defined positions in the tape.

U.S. Pat. No. 5,164,247 describes a method of improving the wearing resistance of layers produced by means of filled tapes. Densificiation of the tape by means of rolling is here proposed.

U.S. Pat. No. 6,649,682 B1 describes the use of hard materials which are applied like a paint for wearing protection, in particular, for producing particularly thin layers. It is expressly emphasized that the hard materials used must not dissolve in the metal bath.

U.S. Pat. No. 6,309,761 B1 describes a general problem of the temperature sensitivity of the materials used in coating by means of soldering processes, as are preferably used in, for example, the application of tapes, pastes or paints to steel bodies. The heat input, e.g., during the soldering process, has an adverse effect not only on the hard material but also on the substrate. The problem is circumvented by using a "perform". This means that the coating is applied to a thermally insensitive metallic substrate and then applied together with this metallic substrate to the actual component to be coated. This solution is a variant for the protection of the microstructure of the component to be coated.

WO2004/085690 describes a method of producing spherical fused tungsten carbide (FTC) and monophase tungsten carbide (WC) with the addition of doping elements selected from the group consisting of Ti, V, Nb and Ta.

In all the inventions cited, one of the best materials existing in the sector of wearing protection, classical fused tungsten carbide, is not used in practice for coating by means of soldering operations. The reason for this is the dissolution of FTC in the metal bath during the soldering operation, which makes the protective layer unusable.

SUMMARY

An aspect of the present invention is to provide hard material-containing systems in which the hard material has the best possible combination of hardness, toughness and resistance to metal melts. The hard material-containing systems should also be suitable for use in paints, pastes through to self-supporting but flexible components such as foils. An additional aspect of the present invention was to provide hard material-containing systems by means of which fields of use such as surface coating and in particular the production of drill bits could be accessed.

In an embodiment, the present invention provides a dispersion comprising hard material particles and at least one organic binder and/or at least one plasticizer. The hard material particles comprise an inner core comprising a fused tungsten carbide and an outer shell comprising tungsten carbide.

DETAILED DESCRIPTION

The dispersions can also contain hard material particles and at least one organic binder and/or at least one plasticizer, where the hard material particles have an inner core composed of fused tungsten carbide and/or an alloy consisting of fused tungsten carbide and at least one further carbide of elements selected from groups 4A, 5A and 6A of the Periodic Table of the Elements and an outer shell composed of an alloy consisting of tungsten carbide and at least one further carbide of elements selected from groups 4A, 5A and 6A of the Periodic Table of the Elements.

If the inner core or the outer shell of the hard material particles consists of an alloy of fused tungsten carbide and a further carbide of elements selected from groups 4A, 5A and 6A of the Periodic Table of the Elements, i.e., at least one carbide of the elements Ti, Zr, Hf, V, Nb, Ta, Cr, Mo, the total content of further carbides can be up to 10% by weight.

In an embodiment of the present invention, a solder material, in particular, a hard solder or a high-temperature solder, can also be present. In a further, embodiment, mixtures of various hard materials can also be present, in which case one of the hard materials should always be a tungsten carbide having a core composed of fused tungsten carbide.

It has been found that the hard material particles, optionally together with solder material powders, can be processed in the presence of a binder suspension containing an organic binder and optionally a plasticizer to form a stable slip. The hard material particles can readily be incorporated into the solder material matrix since slight wetting by the solder material occurs.

Casting of the slip, e.g., to form the corresponding foil/wearing protection foil, paste or paint, has barely any influence on the distribution of the hard material particles in the solder material matrix. This can be attributed to the use of an organic binder, as a result of which the good hard material distribution in the metal matrix is stabilized during production of the composition. Subsequent drying of the composition or removal of binder from the foil at low temperatures below 400° C. likewise does not appreciably influence the particle distribution in the composition. The composition obtained can, when processed to give a foil, also be presintered, i.e., the foil is subjected to a sintering step before it is applied to a component in order to produce the wearing protection layer in a subsequent step. The presintering of the foil reduces the shrinkage of the foil in the production of wearing protection layers on the desired component. However, this does not rule out application of wearing protection foils which have not been presintered or which have not been subjected to binder removal directly onto the respective component, followed by binder removal and further processing. In addition, the presintered foils can also readily be adhesively bonded onto a component or be soldered onto the component using an additional solder, e.g., by means of flame soldering, or be welded on.

In an embodiment of the present invention, it is also possible for a presintered or unpresintered wearing protection foil according to the present invention to be placed in a mold, the mold filled with a powder mixture (e.g., composed of tungsten carbide or other hard materials) and subsequently completely infiltrated with a metallic binder or a solder. In this way, in the case of an unpresintered wearing protection foil, the organic binder is burnt out and the resulting porous structure composed of the hard material is infiltrated with the metallic binder or solder. This procedure is useful, for example, for the production of drill bits. The mold is then usually a graphite mold.

In an embodiment of the present invention, an additional filler in a dispersion can be diamond. If the dispersion is configured in the form of a foil, there is, according to the present invention, the possibility of introducing the diamonds in accordance with a prescribed drawing at a particular geometrically defined position in the foil. This position should not be significantly changed by the soldering or coating process, as a result of which the dispersion with the diamonds can still be used advantageously for targeted protection of the surfaces. The present invention also provides wearing protection foils obtained from the dispersions according to the present invention.

The wearing protection foils, pastes or paints as here described are particularly suitable for application to components by hard soldering or high-temperature soldering, in particular, in vacuum furnaces. In the case of presintered wearing protection foils, these can also be adhesively bonded on, soldered on or welded on. Even after the high temperature during the sintering, presintering, hard soldering or high-temperature soldering process, the wearing protection layers obtained display a virtually isotropic microstructure in terms of the particle distribution and a very low porosity, as a result of which low abrasion and a high hardness is achieved over the entire area to be upgraded of the component. Pore formation is reduced by the good wetability of the hard material particles by the solder material, since good bonding occurs at the interface between the metal-enveloped hard material particles and the solder material.

The hard material particles used according to the present invention (hereinafter referred to as "macroline FTC" for short) are, in particular, fused tungsten carbide particles or alloys thereof with at least one carbide of the elements Ti, Zr, Hf, V, Mo, Nb, Ta and Cr and having a shell composed of tungsten carbide.

Fused tungsten carbide (FTC) is a mixture of WC and $W_2C$, which, in particular, is a eutectic microstructure composed of WC and $W_2C$. FTC is a eutectic mixture of WC and ditungsten carbide ($W_2C$), where the average carbon mass ratio is generally in the range from 3.8 to 4.2% by weight. This corresponds to a phase distribution of 73-80% by weight of $W_2C$ and 20-27% by weight of WC. FTC has a very fine-grained crystal microstructure which is often described as a feather structure and is obtained by rapid quenching of a carbide melt. The shell of the particles consists of tungsten monocarbide, also referred to as tungsten carbide WC. One fused tungsten carbide having a WC shell is, for example, macroline fused tungsten carbide (FTC, of the Amperweld® powder series from H.C. Starck GmbH).

The hard material used according to the present invention, macroline FTC, can be obtained by converting FTC into WC to a desired depth by carburization, and can generally be used for producing wearing protection layers and wear-resistant components.

In particular, the excellent toughness and hardness of the FTC in the core of the WC/FTC composite of the macroline FTC used according to the present invention is retained even when it is processed in a conventional way, i.e., brought into contact with a liquid matrix material.

The hard material used according to the present invention can, for example, have a content of bound carbon of from 4 to 6% by weight, for example, from 4.5 to 5.5% by weight. The content of free carbon should not exceed 0.1% by weight.

If the content of bound carbon is less than 4% by weight, no sufficiently dense WC shell is formed and therefore no increase in the chemical resistance compared to FTC is observed. If the content of bound carbon approaches the limit value of 6.13% by weight corresponding to pure WC, the FTC core becomes so small that an increase in the hardness compared to pure WC is no longer achieved.

The advantageous properties of the hard material powder used according to the present invention are also maintained when it has a small proportion of WC particles, i.e., not all powder particles are made up of a core composed of FTC and a WC shell. Such tungsten carbide powders are therefore likewise encompassed by the present invention. According to the present invention, a powder mixture consisting of tungsten carbide particles and fused tungsten carbide particles having a tungsten carbide shell can thus also be used for the wearing protection foils.

In an embodiment of the present invention, at least 70%, in particular at least 80%, advantageously at least 90%, of the powder particles having a core composed of FTC and a WC shell can be used.

The average particle size can vary within a wide range and depends, in particular, on the planned use and thus the thickness of the wearing protection foils according to the present invention.

The particle size as determined by means of RoTap sieve analysis in accordance with ASTM B 214 can generally be up to 3000 μm. A particle size fraction determined by means of RoTap sieve analysis in accordance with ASTM B 214 of from 3 μm to 1500 μm, from 5 μm to 1000 μm, for example, from 5 μm to 500 μm, for example, from 10 μm to 300 μm or from 10 to 180 μm, can advantageously be used.

If foils or pastes are employed for producing drill bits by infiltration in graphite molds, the particle size distribution of the hard materials used can naturally be matched to the particle size of the surrounding pulverulent hard materials so as not to adversely affect the infiltration behavior via the capillary action of the pores. The usual particle size range here is also from 10 to 250 μm.

The setting of the average particle size can, for example, be effected by selection of an FTC powder having a particular average particle size as starting material for producing the macroline FTC. However, it is, for example, also possible to mix particular particle fractions into or remove particular particle fractions from previously produced macroline FTC, for example, by sieving or classification.

In the hard material powder used according to the present invention, the FTC core is surrounded by a dense shell of tungsten monocarbide. The thickness of the shell, determined by means of optical microscopy on etched material, can, for example, be from 0.05 to 0.4 times the average particle size determined by means of RoTap sieve analysis in accordance with ASTM B 214, for example, from 0.05 to 0.15 times.

Macroline FTC has an excellent hardness. The Vickers hardness can, for example, be >2000 $HV_{0.1}$, for example, >2500 $HV_{0.1}$.

The morphology of the particles can be set by, for example, use of a suitable FTC powder.

The hard material powder used according to the present invention can accordingly have various morphologies, for example, broken sharp-edged or spherical. The spherical morphology offers in-principle advantages in respect of the wearing resistance, but is more difficult to produce than powders having an irregular morphology. It is also possible to use mixtures of powders having different morphologies.

The hard material powder used according to the present invention can be obtained by a process for producing the tungsten carbide according to the present invention (macroline FTC), in which fused tungsten carbide powder is heated in the presence of a carbon source to a temperature of from 1300° C. to 2000° C., for example, from 1400° C. to 1700° C.

The process can be carried out in the presence of inert gas, in the presence of reactive gas or under reduced pressure. The process can, for example, be carried out in the presence of hydrogen.

Suitable reactive gases are, in particular, gaseous carbon sources, for example, carbon monoxide, a $CO/CO_2$ mixture, a hydrocarbon or a hydrocarbon mixture such as natural gas.

Possible carbon sources are gaseous and solid carbon sources. As solid carbon source, it is possible to use, for example, carbon black or graphite. It is naturally also possible to use mixtures of various gaseous and/or solid carbon sources.

The heat treatment of FTC in the presence of the carbon source results in conversion of FTC into WC at the surface. A dense WC layer is thus formed around the FTC.

Temperature, reaction time and the amount of carbon source added are selected so that the shell of WC is formed with the desired thickness. FTC must be retained in the interior of the particles. The conditions to be adhered to are determined essentially by the particle size and particle shape of the FTC powder used and can be determined by experiments. If the carbon content is set too high, this increases the time and temperature required for the reaction and unnecessarily reduces the proportion of feather-like microstructure, i.e., the proportion of FTC. It has been found to be advantageous to add the carbon source in such an amount that the total carbon content in the reaction mixture, i.e., the sum of the carbon contents of FTC and carbon source, is from 4 to 6% by weight, for example, from 4.3 to 5.5% by weight.

In the reaction of FTC having powder particles of widely differing particle sizes, finer particle fractions can be carburized to a greater extent relative to their particle diameter than coarser particles. This applies in particular to powders having a high content of fines <45 μm and can be prevented by prior removal of the fines and separate reaction of the various powder fractions. The reaction times are usually from 1 to 10 hours, for example, from 1.5 to 7 hours.

To produce the hard material powder used according to the present invention for the dispersions, it is thus possible, for example, to start out from broken or spherical FTC which is sieved to the desired particle size. The material is subsequently intensively mixed with a carbon source, e.g., carbon black, in the desired amount, subjected to heat treatment and carburized at the periphery. Conventional push-through furnaces or comparable apparatuses which can be operated, for example, in the temperature range from 1550° C. and 1900° C. under a hydrogen atmosphere or protective gas are suitable for the heat treatment. The mixture of FTC and carbon black is, for example, introduced into graphite boats. In the reaction, the carbon reacts with the $W_2C$ present in the FTC and converts it into WC, which is no longer distinguishable from the WC previously present. The WC border formed in this way forms a natural diffusion barrier for the carbon, so that the desired carburization depth can be controlled by means of the parameters time and temperature.

In an embodiment of the present invention, the dispersions claimed can contain plasticizers in addition to the organic binder. The proportion of the organic binders and plasticizers is from 0% by weight to 20% by weight based on the total weight. Here, organic binders and plasticizers can, for example, be used in a weight ratio in the range from 100:0 to 50:50. If an organic binder is present in the wearing protection foil, this is, for example, present in a proportion by weight in the range from 0.5% by weight to 15% by weight, in particular from 2% by weight to 10% by weight; the plasticizer can, for example, be present in a proportion by weight in the range from 0.1% by weight to 10% by weight, in particular from 0.5% by weight to 5% by weight, based on the total weight of the foil.

In an embodiment of the present invention, organic binders and plasticizers can, for example, be used which decompose at temperatures below 400° C., for example, below 350° C. Suitable organic binders are, for example, polymers having a low ceiling temperature of advantageously 200° C. or less, e.g., halogenated polyolefins, in particular Teflon, polyacetals, polyacrylates or polymethacrylates or copolymers thereof, polyalkylene oxides, polyvinyl alcohols or derivatives thereof, polyvinyl acetates, polyoxymethylene or polyvinyl butyrals. For example, organic binders selected from the group consisting of polyalkylene carbonates, in particular polypropylene carbonate can be used. The organic binder serves, in particular, to bind the individual solid particles to one another on drying. The binder should be readily soluble in the solvent and also be compatible with further additives such as dispersants. The addition of the binder advantageously increases the viscosity of the slip very little and has a stabilizing effect on the suspension. The organic binder should, for example, burn out without leaving a residue at low temperatures below 400° C. Advantageous binders are, for example, polyoxymethylene, polyacrylates or polymethacrylates which depolymerize and the monomer formed is either burnt or vaporized.

The binder also gives an improved shelf life and improved handleability of the green composition; in particular, it reduces the formation of cracks, for example, during drying. This applies particularly to the viscosity range of the foils.

Suitable plasticizers are, for example, phthalates such as benzyl phthalate, glues, waxes, gelatins, dextrins, gum arabic, oils such as paraffin oil or polymers such as polyalkylenes, in particular polyethylene. Plasticizers can, for example, be, alkylene carbonates, in particular, propylene carbonate. The plasticizer should, in particular, reduce the glass transition temperature of the polymeric binder and bring about a greater flexibility of the green foil. The plasticizer penetrates into the network structure of the binder and thus reduces the viscosity of the slip. Setting a suitable binder/plasticizer ratio and combining various binders and plasticizers enables, for example, the ultimate tensile strength and ductility of the green compositions to be influenced. The plasticizers used also, for example, burn out completely at low temperatures below 400° C.

For the purposes of the present invention, solder materials are hard solders or high-temperature solders. Possible solder materials are, in particular, solder powders selected from the group consisting of nickel, titanium, cobalt, copper, tin and silver solders. Suitable solders are, for example, hard solders such as copper/tin solders, silver/cadmium/copper solders, silver/phosphorus solders. Use can be made, for example, of high-temperature solders such as solders based on nickel or cobalt, e.g., cobalt/chromium-, nickel/chromium-containing solders or nickel/cobalt-containing solders.

In an embodiment of the present invention, the hard material particles are used in combination with nickel-containing solder materials. The use of the fused tungsten carbide enveloped by tungsten carbide as hard material particles enables the dissolution of the hard material in the solder material to be reduced.

The dispersions described here generally contain, based on the total weight of the composition, from 5% by weight to 95% by weight, for example, from 10% by weight to 90% by weight, of hard material particles and optionally from 5% by weight to 95% by weight, for example, from 10% by weight to 50% by weight, of solder material particles. The dispersions can, for example, contain from 60% by weight to 80% by weight of hard material particles and optionally from 20% by weight to 40% by weight of solder material. As a result of the different compositions of the dispersions, the desired viscosities of the intermediates and end products such as wearing protection foils and composites are achieved.

The mixing ratio of the hard material and the solder materials can be varied as a function of the respective wearing protection application. The solder materials used can be selected on the basis of the desired soldering temperature and the material of the component to be coated. The solder materials should, for example, have a solidus temperature above the decomposition temperature of the organic additives used. The dispersions additionally contain organic binder, which can optionally contain plasticizer, to 100% by weight.

The dispersions described can, if they have been processed as foils, also be laminated with further hard material-containing and/or solder material-containing layers. For example, two or more foils according to the present invention which are characterized by a different content of hard material particles or of solder material can be laminated to give a composite foil or composite.

The present invention therefore further provides composites containing at least one of the above-described dispersions in the form of a wearing protection foil, with the individual layers of the composite containing different proportions of hard material particles and/or solder material particles. Such composites can, for example, have a layer having a proportion in the range from 40% by weight to 95% by weight, for example, from 60% by weight to 90% by weight, of hard material particles and optionally from 5% by weight to 60% by weight of solder material. Furthermore, the composites have at least one further layer which contains mainly solder material, for example, in a proportion in the range from 40% by weight to 100% by weight, for example, from 60% by weight to 90% by weight. This layer, too, can contain hard material particles, in particular in a proportion by weight of from 10% to 40%. Such composites can also be sintered onto the component and/or be presintered. Sintered composites can likewise readily be adhesively bonded onto, soldered onto or welded onto the component.

The dispersions of the present invention can, in particular, also be configured as flat foils or be three-dimensionally shaped foils. The layer thickness of the foils is in the range from 10 μm to 3000 μm, in particular, from 50 μm to 2500 μm, for example, from 200 μm to 2000 μm.

The present invention further provides a process for producing the dispersions, in particular, a tape casting process for producing wearing protection foils, which is simple to carry out on an industrial scale and is accordingly inexpensive. For this purpose, a binder suspension containing at least one solvent and an organic binder is firstly produced.

Possible solvents are, in particular, organic solvents. However, the addition of water can also be advantageous in particular cases. Solvents can, for example, be esters, ethers, alcohols or ketones, in particular, methanol, ethanol, propanol, butanol, diethyl ether, butyl methyl ether, methyl acetate, ethyl acetate, acetone, methyl ethyl ketone (MEK) or mixtures thereof. Solvents can, also, for example, be ketones, in particular, from the group consisting of alkyl ketones. Organic binders used can, for example, be the above-mentioned compounds, in particular, polyalkylene carbonates. Furthermore, a plasticizer can also be added directly to the binder suspension. The mixture obtained is mixed and homogenized in a mixing apparatus, e.g., a ball mill.

The binder suspension produced in this way is then admixed with hard material particles and optionally the solder material and processed to form a slip. This can be carried out, for example, in a tumble mixer or in a ball mill, with the ball mill being charged with milling media which, for example, have a higher density than the hard material particles to be processed. The binder suspension can, for example, be initially placed in the ball mill, but can also be added subsequently. Furthermore, the hard material powder and the solder material powder are introduced into the ball mill, and the mixture obtained is milled and stirred until a stable slip is formed. When a ball mill is used, sufficient mixing and homogenization of the slip generally takes from 4 hours to 48 hours. The slip can subsequently be degassed under subatmospheric pressure. The storage, degassing and other processing steps can, for example, be carried out with continual stirring in order to prevent sedimentation of the solid constituents of the slip.

In alternative embodiments, it is naturally also possible for the hard material particles and/or solder material particles to be prealloyed and added to the binder suspension. Continuous or little-by-little addition of the binder suspension during production of the slip is also conceivable.

The slip obtained can then be, depending on the viscosity set, processed to give a paint or a paste or cast by means of conventional tape casting processes to give a foil. The viscosity of the dispersion produced decreases in the order: foil>paste>paint.

To produce the slip, from 5% by weight to 60% by weight, for example, from 10% by weight to 30% by weight, of the binder suspension is used based on the total weight of the slip (including solvent). The binder suspension comprises from at least 1% by weight to 60% by weight, for example, from 5% by weight to 40% by weight, of organic binder based on the total weight of the binder suspension and from 0% by weight to 15% by weight, for example, from 2% by weight to 10% by weight, of plasticizer based on the total weight of the binder suspension (including solvent). The binder suspension contains a sufficient amount of solvent in order to provide at least a suspension of the individual constituents of the binder suspension. The use of larger amounts of solvent which are necessary for suspending the hard material particles and the solder material particles is equally possible. Moreover, further binder suspension or solvent can be added as required during the entire process for producing the slip. The amount of solvent can, for example, be metered so that slips having a high solids content are formed.

Further useful additives, in particular dispersants, antifoams or protective colloids, e.g., polyester-polyamine condensation polymers, alkyl phosphate compounds, polyvinyl alcohols, dextrins or cellulose ethers, can be added to the slip or the binder suspension.

When the dispersion is used for tape casting using a slip, conventional tape casting apparatuses can be used. Here, the slip is introduced into a reservoir under which a plastic carrier runs and is conveyed continuously at a regulated speed under the reservoir. The slip is cast from the reservoir onto the plastic film and wiped by means of a doctor blade to a particular thickness. This produces a smooth and even foil which is subsequently generally dried at variable temperatures, optionally peeled off from the plastic film and rolled up or processed further or finished for sale. The process described displays a high production speed and thus has advantageous manufacturing costs, with the quality of the foils produced having a good constancy. Furthermore, different foil thicknesses, in particular in the range from 10 µm to 3000 µm, and foil widths can easily be set. The maximum foil width is prescribed by the tape casting apparatus used. Owing to the pronounced pseudoplastic behavior of the slip, foil widths of up to 400 mm can be produced without problems. The foil thickness and width can be set by means of the following parameters: cutting height of the doctor blade, fill height and thus casting pressure of the slip in the casting chamber, drawing speed of the plastic substrate, casting shoe width and viscosity of the slip. The foil thickness fluctuation over the width and length is usually less than 10% in this process. If structured plastic carriers are used as a casting substrate, simple structures can also be introduced into the wearing protection foil.

In contrast to other processes for foil production, three-dimensional structures can be cast into the foils during tape casting. An embodiment of the present invention comprises casting around diamond plates which are fixed beforehand on the plastic substrate. In this way, it is possible to provide not only arbitrary distribution of diamonds in the hard material dispersion but also a specific three-dimensional arrangement of diamond plates.

The pastes and foils produced by the process of the present invention are particularly suitable for further upgrading. An embodiment of the present invention is rolling to increase the packing density of the hard materials in the dispersion. Rolling of the dispersions can, for example, be carried out directly on the casting table but also separately in calendering machines.

An alternative process is the vacuum slip casting process which is particularly suitable for producing three-dimensionally shaped wearing protection foils. In vacuum slip casting, the process is significantly accelerated by application of a subatmospheric pressure. In this process, the slip is poured into a porous mold through which the solvent present is sucked away by means of the subatmospheric pressure. The solids present in the slip deposit on the surface of the mold and thus form a three-dimensionally shaped foil which after drying can be detached from the mold. In particular, very thin foils having a thickness of down to 1 µm can be obtained by the vacuum process, and the solvent taken off can also be reused. The vacuum process can likewise be utilized on an industrial scale.

In an embodiment of the production process, a suspension composed of solvent, e.g., an alkyl ketone, a binder, for example, polypropylene carbonate, and a plasticizer, for example, propylene carbonate, is homogenized and mixed in a ball mill for a number of days. The resulting mixture of the organic additives represents the basis for the dispersion. In the next step, a ball mill is charged with milling media and the binder suspension produced is weighed in. The amount of milling media used should be matched to the amount of solids in the slip and the milling media should have a higher density than the hard material used. The hard material powder and optionally solder powder are then weighed in. A solder material is optionally used. As solder materials, it is advantageous to use nickel/chromium solder powder, e.g. NICROBRAZ solder powder (Wall Colmonoy). The slip obtained is mixed with continuous stirring for from 0.5 h to 24 h. The mixed slip is then transferred to a specific casting vessel and degassed. Owing to the high density of the powders used, the slip must be continually stirred slowly so as to avoid sedimentation of the solid constituents. The degassed slip is then, depending on the viscosity set, processed as paint or paste or cast on a commercial casting apparatus to give a strong and flexible foil. As a substrate, use can, for example, be made of a plastic carrier, in particular, a silicone-coated plastic film, for example, of PET, which should withstand the tensile forces during the casting process and have low adhesion to the dried slip or the green foil so that it can easily be removed. The wet foil produced is dried in a convection drying channel, for example, at temperatures in the range from 25° C. to 85° C. Green foils having, in particular, a density of 2.5-15 g/cm$^3$ can be produced by the process described. The proportion of solid organic additives in the dispersion is, for example, in the range from 1% by weight to 25% by weight, in particular from 2% by weight to 10% by weight, in the case of a foil.

The production of wearing protection foils by means of tape casting has many advantages. For example, large amounts of hard material particles can be mixed without problems into a matrix of solder material in the production of the slip when an organic binder is used. Furthermore, use of an organic binder stabilizes the foil obtained, in particular, in respect of mechanical stress, and the handleability of the foil is increased in this way; in particular, the further processing of the foil is thereby made easier.

The wearing protection foils described herein are particularly suitable for producing wearing protection layers by means of hard soldering at above 450° C., for example, by means of high-temperature solders at above 900° C., with production of a strong bond between the foil and the component being effected by liquid-phase sintering, as a result of which a diffusion zone is formed at the interface. This forms particularly intimate bonds between the wearing protection layer and the component. The liquid-phase sintering is usually carried out under protective gas and/or under reduced pressure, with a small amount of hydrogen often being mixed in as oxidation protection. Hard soldering and high-temperature soldering can be used, in particular, for coating metallic components which have a surface composed of steel or which have a metal surface containing, for example, iron, copper, molybdenum, chromium, nickel, aluminum, silver or gold, with the melting point of the surface or the solidus temperature thereof advantageously being above the liquidus temperature of the solder material present in the wearing protection foil.

In order to produce a wearing protection layer, the binder-containing wearing protection foils can be applied directly to a component, subjected to binder removal and then processed further to give the corresponding protective layer. When applied to component surfaces or for coating of a substrate, the wearing protection foils can, for example, be subjected to binder removal and presintered beforehand in order to minimize the foil shrinkage in the production of the wearing protection layer on the component. Binder removal means the removal, for example, without leaving a residue, of the organic constituents required for tape casting. If residues in the form of carbon remain, this leads to formation of carbides in the subsequent sintering process, but this does not necessarily have to be disadvantageous. Binder removal is carried out thermally according to a suitable temperature/time profile. The temperature should not go above 400° C. Binder removal is usually carried out under nitrogen or argon, sometimes with a small proportion of hydrogen in order to remove any oxygen present from the atmosphere. Complete removal of binder from the foil can take up to one day.

The dispersions according to the present invention are suitable for surface coatings and in particular for producing wearing protection foils on components, for producing drill bits and composites.

EXAMPLES

Example 1

Production and Further Use of a Dispersion

In a first step, the organic base composition in which the hard material particles (macroline FTC) are later dispersed is produced. For this purpose, the following materials as per Table 1 were mixed with milling media in a stirred container and homogenized for 48 hours:

TABLE 1

| Use | Material | Proportion in % by weight |
| --- | --- | --- |
| Solvent | Methyl ethyl ketone (MEK) | 70 |
| Binder | Polypropylene carbonate | 25 |
| Plasticizer | Propylene carbonate | 5 |

The dispersion was subsequently produced by adding the hard material particles (macroline FTC). Here, a ratio (in % by weight) of organic base composition to hard material of 8:92 was set with the aim of producing a very hard material-rich dispersion. The mixture was mixed in a slowly rotating ball mill at 28 rpm and subsequently degassed at a reduced pressure of 480-520 mbar. The dispersion produced in this way was well suited for further processing, e.g., as a foil.

To produce a foil, the dispersion was cast onto a silicone tape. The desired viscosity of the foil was set by subsequent evaporation of the solvent in a conventional convection oven under reduced pressure. At virtually complete evaporation, a flexible foil having an organic binder content of 2-3% by weight was obtained.

Example 2

As in Example 1, but the hard material component consisted of a mixture of macroline FTC and solder material in a weight ratio of 65% (FTC) to 35% (solder material consisting of 86% by weight of nickel, 10% by weight of chromium, 3% by weight of silicon and 1% by weight of boron).

The further processing of the dispersion to give a foil was carried out in a manner analogous to Example 1. The result was a foil which is also referred to as green foil.

Example 3

Production Process for Wearing Parts

The green foil as per Example 2 is used for this purpose. The green foil was cut to a size corresponding to the size of the component to be coated and applied to the component surface. The application of the foil can be carried out without further auxiliaries, but it is also possible to use adhesives which can, for example, be removed by thermal decomposition. In particular, the binder suspension can also be used as adhesive for application of the foil to the component. The component together with the green foil was then treated thermally. In a first thermal treatment step, the binder removal process is, for example, carried out at low temperatures below 350° C. The binder removal temperature is, an embodiment, below the liquidus temperature of the solder material in the foil. The organic additives used are, for example, removed, ideally without leaving a residue, under reduced pressure (below 1 bar). In the subsequent sintering step, the foil from which the binder has been removed was sintered to the component surface in a high vacuum of about $10^{-4}$-$10^{-6}$ mbar. The maximum temperature and the hold time depend on the solder material used, with at least the liquidus temperature of the solder material having to be reached. The liquidus temperature of the solder material should be below the melting point of the hard material. The sintering temperatures are normally in the range from 800° C. to 2000° C., in particular from 1000° C. to 1500° C., for example, from 1050° C. to 1200° C. The solder material used becomes liquid at the prescribed sintering temperature and wets the hard material particles and the component surface. The high vacuum applied aids wetting of the hard material particles and the support with the liquid solder and reduces the porosity in the wearing protection layer produced. A pronounced diffusion layer was formed between the component surface and the wearing protection layer produced. The diffusion layer determines the adhesion of the wearing protection layer to the component surface.

Example 4

In a further process, the green foil from Example 2 was likewise used. In a first step, a presintered foil was produced. The presintering of the green foil was carried out, for example, on a ceramic sintering underlay such as $Al_2O_3$ or $ZrO_2$. After the binder removal cycle up to 400° C., a high vacuum was applied and the hard material foil was sintered on the sintering underlay to give the strong particle composite. The foil which presintered in this way can then be applied to the component and processed by liquid-phase sintering in a manner analogous to Example 3 to give the wearing protection layer. As an alternative, the presintered material can also be adhesively bonded to the surface of the component or soldered on using an additional solder.

Example 5

The foil from Example 1 was laid in a graphite mold and hard material powder, e.g., fused tungsten carbide (FTC) was poured over it. Pieces of solder material based on copper were placed on the surface of the bed, with the weight ratio of solder material to the remaining composition (foil+hard material powder) being 1:1. The filled graphite mold was subsequently infiltrated at a temperature of from about 1000 to 1200° C. in a furnace. For this purpose, it is generally not necessary to use a vacuum furnace since a natural $CO/CO_2$ protective gas atmosphere is established in the graphite mold.

Example 6

The dispersion from Example 1 was introduced into an open container. A substrate, e.g., composed of structural steel, was then dipped into the dispersion. The substrate which was coated in this way was then removed from the dispersion, dried at temperatures of 80° C. in a drying oven and subsequently coated with a layer of solder material as per Example 2 and infiltrated at a temperature of about 1100° C.

Example 7

The dispersion as per Example 2 was converted by partial evaporation of the solvent (MEK) at a temperature of 60° C. into a viscous paste. This paste was then applied by means of a spatula to the damaged, e.g., cracked, surface of a component, e.g., a drill bit. In a further step, the paste was soldered in by means of a conventional soldering burner. The component which has been treated in this way displays a crack-free surface.

The wearing protection layers produced in Examples 3 to 6 have a low porosity of less than 5%, for example, less than 1.5%, or for example, less than 1%. The porosity was determined optically in accordance with ISO 4505 on a polished section of the wearing protection layer. Furthermore, the wearing protection layers have a density of from 2.5 $g/cm^3$ to 25 $g/cm^3$, for example, from 5 $g/cm^3$ to 15 $g/cm^3$. The wearing protection layers produced have a high hardness. Wearing protection layers having a Rockwell hardness in the range from 40 HRC to 70 HRC can be produced without problems. Wearing protection layers can, for example, have a Rockwell hardness of at least 50 HRC.

The present invention is not limited to embodiments described herein; reference should be had to the appended claims.

What is claimed is:

1. A dispersion comprising:
    hard material particles;
    at least one of at least one organic binder and at least one plasticizer; and
    diamonds,
    wherein, the hard material particles comprise an inner core comprising a fused tungsten carbide and an outer shell comprising tungsten carbide.

2. A dispersion as recited in claim 1, wherein
    the inner core comprises at least one of a fused tungsten carbide and an alloy consisting of the fused tungsten carbide and at least one additional carbide of elements selected from groups 4A, 5A and 6A of the Periodic Table of the Elements; and
    the outer shell comprises an alloy consisting of the tungsten carbide and at least one additional carbide of elements selected from groups 4A, 5A and 6A of the Periodic Table of the Elements.

3. The dispersion as recited in claim 1, further comprising solder material particles selected from the group consisting of a hard solder and a high-temperature solder.

4. The dispersion as recited in claim 3, wherein the solder material particles are selected from the group consisting of nickel solder materials, cobalt solder materials, copper solder materials, tin solder materials, and silver solder materials.

5. The dispersion as recited in claim 3, wherein the solder material particles comprise a nickel/chromium solder material or a nickel/cobalt solder material.

6. The dispersion as recited in claim 3, wherein the dispersion comprises, based on a total weight of the dispersion:
    5 wt.-% to 95 wt.-% of the hard material particles,
    0 wt.-% to 95 wt.-% of the solder material particles, and
    2 wt.-% to 25 wt.-% of the at least one of the at least one organic binder and the at least one plasticizer.

7. The dispersion as recited in claim 1, wherein at least one of the at least one organic binder and the at least one plasticizer has a decomposition temperature of below 400° C.

8. The dispersion as recited in claim 1, wherein at least one of the at least one organic binder is a polypropylene carbonate and the at least one plasticizer is a propylene carbonate.

9. The dispersion as recited in claim 1, wherein the inner core comprises a eutectic mixture of monotungsten carbide (WC) and ditungsten carbide ($W_2C$).

10. The dispersion as recited in claim 1, wherein the hard material particles have a particle size as determined by a RoTap sieve analysis in accordance with an ASTM B 214 of up to 3000 μm.

11. The dispersion as recited in claim 1, wherein the hard material particles have a spherical shape.

12. A dispersion consisting of:
   5 wt.-% to 95 wt.-% of hard material particles;
   2 wt.-% to 25 wt.-% of at least one of at least one organic binder and at least one plasticizer; and
   0 wt.-% to 95 wt.-% of solder material particles selected from the group consisting of a hard solder and a high-temperature solder,
   wherein,
   each wt.-% is based on a total weight of the dispersion, and
   the hard material particles consist of one inner core consisting of a fused tungsten carbide and one outer shell consisting of tungsten carbide.

13. The dispersion as recited in claim 12, wherein the solder material particles are selected from the group consisting of nickel solder materials, cobalt solder materials, copper solder materials, tin solder materials, and silver solder materials, or wherein the solder material particles comprise a nickel/chromium solder material or a nickel/cobalt solder material.

14. The dispersion as recited in claim 12, wherein at least one of the at least one organic binder and the at least one plasticizer has a decomposition temperature of below 400° C.

15. The dispersion as recited in claim 12, wherein at least one of the at least one organic binder is a polypropylene carbonate and the at least one plasticizer is a propylene carbonate.

16. The dispersion as recited in claim 12, wherein the inner core comprises a eutectic mixture of monotungsten carbide (WC) and ditungsten carbide ($W_2C$).

17. The dispersion as recited in claim 12, wherein the hard material particles have a particle size as determined by a RoTap sieve analysis in accordance with an ASTM B 214 of up to 3000 μm.

18. The dispersion as recited in claim 12, wherein the hard material particles have a spherical shape.

19. A dispersion consisting of:
   5 wt.-% to 95 wt.-% of hard material particles consisting of one inner core and one outer shell;
   2 wt.-% to 25 wt.-% of at least one of at least one organic binder and at least one plasticizer; and
   0 wt.-% to 95 wt.-% of solder material particles selected from the group consisting of a hard solder and a high-temperature solder,
   wherein,
   each wt.-% is based on a total weight of the dispersion,
   the one inner core of the hard material particles consists of at least one of a fused tungsten carbide and an alloy consisting of the fused tungsten carbide and at least one additional carbide of elements selected from groups 4A, 5A and 6A of the Periodic Table of the Elements, and
   the one outer shell of the hard material particles consists of an alloy consisting of a tungsten carbide and at least one additional carbide of elements selected from groups 4A, 5A and 6A of the Periodic Table of the Elements.

20. The dispersion as recited in claims 19, wherein the solder material particles are selected from the group consisting of nickel solder materials, cobalt solder materials, copper solder materials, tin solder materials, and silver solder materials, or wherein the solder material particles comprise a nickel/chromium solder material or a nickel/cobalt solder material.

21. The dispersion as recited in claim 19, wherein at least one of the at least one organic binder and the at least one plasticizer has a decomposition temperature of below 400° C.

22. The dispersion as recited in claim 19, wherein at least one of the at least one organic binder is a polypropylene carbonate and the at least one plasticizer is a propylene carbonate.

23. The dispersion as recited in claim 19, wherein the inner core comprises a eutectic mixture of monotungsten carbide (WC) and ditungsten carbide ($W_2C$).

24. The dispersion as recited in claim 19, wherein the hard material particles have a particle size as determined by a RoTap sieve analysis in accordance with an ASTM B 214 of up to 3000 μm.

25. The dispersion as recited in claims 19, wherein the hard material particles have a spherical shape.

* * * * *